United States Patent [19]
Provenzano et al.

[11] Patent Number: 5,381,299
[45] Date of Patent: Jan. 10, 1995

[54] CAPACITIVE PRESSURE SENSOR HAVING A SUBSTRATE WITH A CURVED MESA

[75] Inventors: Paul L. Provenzano, West Hartford; James L. Swindal, East Hampton; Robert J. Kuhlberg, Windsor; Charles B. Brahm, Ellington; Harold D. Meyer; Frank W. Gobetz, both of South Windsor; Walter J. Wiegand, Glastonbury; Robert H. Bullis, Avon, all of Conn.

[73] Assignee: United Technologies Corporation, Hartford, Conn.

[21] Appl. No.: 188,952

[22] Filed: Jan. 28, 1994

[51] Int. Cl.⁶ .................................... H01G 7/00
[52] U.S. Cl. ........................ 361/283.4; 73/718; 73/724; 29/25.42
[58] Field of Search ............. 361/283.1, 283.3, 283.4; 73/715, 718, 724, 25.41, 25.42, 621.1; 257/419; 338/4, 42; 128/675, 748

[56] References Cited

U.S. PATENT DOCUMENTS

| | | | |
|---|---|---|---|
| 2,667,786 | 2/1954 | Spaulding | 73/724 |
| 3,222,581 | 12/1965 | Lenfant | 361/283.4 |
| 4,405,970 | 9/1983 | Swindal | 361/283.1 |
| 4,415,948 | 11/1983 | Grantham et al. | 29/25.41 |
| 4,467,394 | 8/1984 | Grantham et al. | 361/283.4 |
| 4,501,051 | 2/1985 | Bell | 29/25.41 |
| 4,513,348 | 4/1985 | Grantham | 29/25.41 |
| 4,517,622 | 5/1985 | Male | 73/718 |
| 4,530,029 | 7/1985 | Beristain | 29/25.42 |
| 4,743,836 | 5/1988 | Grzybowski et al. | 361/280 |
| 4,829,826 | 5/1989 | Valentin | 43/718 |
| 4,879,627 | 11/1989 | Grantham | 73/718 |
| 4,883,768 | 11/1989 | Swindal et al. | 437/61 |
| 4,951,174 | 8/1990 | Grantham et al. | 361/283.4 |
| 4,954,925 | 9/1990 | Bullis et al. | 361/283.4 |
| 4,998,179 | 3/1991 | Grantham | 73/724 |
| 5,044,202 | 9/1991 | Southworth | 361/283.4 |

Primary Examiner—Bruce A. Reynolds
Assistant Examiner—Michael D. Switzer
Attorney, Agent, or Firm—Richard H. Kosakowski

[57] ABSTRACT

A silicon capacitive pressure sensor is disclosed having a silicon substrate and a silicon diaphragm separated by a glass dielectric spacer. The substrate has an upper surface formed as a mesa which is generally curved in shape, the curvature being concave. Due to manufacturing constraints the mesa upper surface comprises a series of concentric rings that approximate the desired concave shape. The step height and diameter of the rings are such that, at full deflection of the diaphragm, the diaphragm touches the center of the mesa, but not the edges of the individual steps. That is, letting the edges or corners of the steps define a curve, the radius of curvature of the diaphragm is smaller than the radius of curvature of the locus of the step corners.

17 Claims, 3 Drawing Sheets

CAPACITIVE PRESSURE SENSOR HAVING A SUBSTRATE WITH A CURVED MESA

BACKGROUND OF THE INVENTION

This invention relates to silicon capacitive pressure sensors, and more particularly to a silicon capacitive pressure sensor having a silicon substrate with a mesa formed therein, the mesa having an upper surface with a generally concave shape.

In the art of silicon capacitive pressure sensors, it is known to provide such a sensor as a single sensing element. Prior art single element silicon capacitive pressure sensors typically comprise a pair of parallel conductive silicon plates. A borosilicate glass spacer is deposited onto one of the plates, and the second plate is attached to the glass spacer by a field-assisted, vacuum bonding process. This forms an evacuated chamber within the opposing conductive plates and spacer. The opposing silicon plates comprise the plates of a pressure variable capacitor. See, for example, U.S. Pat. Nos. 4,415,948, 4,405,970 and 4,530,029. Examples of electronic circuitry used to process the sensor output signals indicative of sensed pressure are described and claimed in U.S. Pat. Nos. 4,743,836 and 4,517,622.

In a silicon capacitive pressure sensor, one conductive silicon plate forms a diaphragm that flexes inwardly in the presence of fluid pressure applied to the outside surface of the diaphragm that is greater in magnitude than the pressure (usually vacuum) in the chamber. The second conductive silicon plate forms a substrate that is normally held rigid. The deflection of the diaphragm causes a variation in the distance between the plates, thereby varying the capacitance of the plates. Thus, the capacitive pressure sensor is operative to transduce pressure variations into corresponding capacitive variations. The borosilicate glass spacer serves not only to separate the plates, but also to seal the vacuum chamber therebetween. The silicon diaphragm and substrate are normally doped to make them appropriately electrically conductive.

These pressure sensing devices are particularly well suited for miniaturization due to the fine dimensional control achievable using the semiconductor and thin-film technologies. Microcircuit technology can produce a large number of pressure sensors fabricated from a single silicon wafer. They are also well suited to the measurement of small differential pressures in various commercial and aerospace applications.

However, in any silicon capacitive pressure sensor, parasitic capacitance is a limitation on the accuracy of the sensor. This is because such parasitic capacitance may result in an overall long-term drift (20 years) of the sensor output. This is especially true in high accuracy (0.05% or 500 ppm) pressure sensing applications at high temperatures (120° C.). This limiting factor may make some sensor designs unsuitable for demanding aerospace applications, such as electronic engine controls ("EECs") and air data computers ("ADCs").

Parasitic capacitance is the inherent capacitance of the non-pressure sensitive interstices of the sensor structure. For example, the parasitic capacitance of the borosilicate glass spacer may comprise upwards of 50% of the total capacitance of the sensor. Such parasitic capacitance reduces the sensor gain because it adds in parallel to the pressure sensitive capacitance of the sensor. This reduces both the dynamic range of the sensor and its sensitivity to pressure changes. Thus, a large effort has been placed in the past on reducing such capacitance through variations in the design of the sensor architecture.

However, parasitic capacitance is inherent in any physical structure and there is a minimum practically achievable value that may still be unacceptable in high sensitivity sensing applications. U.S. Pat. No. 4,405,970 discloses a method of reducing the parasitic capacitance in a silicon capacitive pressure sensor by providing specific borosilicate glass structures that separate fixed portions of the two capacitive plates at a relatively long distance from each other. Another approach to reducing the parasitic capacitance is disclosed in U.S. Pat. No. 4,467,394, in which a three-plate device is utilized that, when combined with appropriate signal processing circuitry, eliminates the parasitic capacitance from the measurement. A further approach to eliminating the parasitic capacitance is disclosed in U.S. Pat. No. 4,951,174.

It is known in the prior art of silicon capacitive pressure sensors to employ a substrate and diaphragm that are both uniformly planar in design and to arrange them in a parallel relationship. Also, it is known to form a planar mesa surface on a parallel planar surface of the substrate. Thus, the parallel relationship of the diaphragm and substrate provides for a uniform spacing therebetween, which further translates into a uniform capacitance therebetween, with no flexing of the diaphragm.

When the fluid pressure applied to an outer surface of the diaphragm exceeds the fluid pressure in the gap between the diaphragm and substrate, the diaphragm flexes toward the substrate. However, the outer edge portions of the diaphragm are fixedly attached to the dielectric glass spacer. Thus, the center of the diaphragm flexes the greatest amount toward the substrate, while the amount of flexing progressively decreases outwardly away from the center of the diaphragm toward its outer edges. At the same time, the mesa surface of the substrate remains planar. Thus, the distance between the planar mesa and the flexed diaphragm varies throughout the gap. This gap variation translates into a variation in the capacitance at different spatial locations between the diaphragm and substrate. More importantly, the non-uniform gap spacing translates into reduced sensitivity of the sensor to changes in fluid pressure applied to the diaphragm.

Accordingly, it is a primary object of the present invention to provide a silicon capacitive pressure sensor having improved sensitivity to the pressure of a fluid applied thereto.

It is a general object of the present invention to provide a silicon capacitive pressure sensor having an increased capacitance over prior art designs for a given value of a pressure of a fluid applied thereto.

It is a further object of the present invention to provide a silicon capacitive pressure sensor having a substrate with a generally curved mesa surface that approximates the curvature of the diaphragm when the diaphragm is flexed by a fluid pressure applied thereto.

It is a still further object of the present invention to provide a silicon capacitive pressure sensor that has a relatively uniform air gap between the diaphragm when flexed and a curved mesa surface of the substrate.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicants have invented a silicon capacitive pressure sensor with a substrate that has a mesa upper surface that is generally curved. In the preferred embodiment of the present invention, a silicon capacitive pressure sensor has a silicon substrate and a silicon diaphragm separated by a glass dielectric spacer. The spacer is formed only at the outer periphery of both the substrate and diaphragm, resulting in a sealed chamber comprising an air gap bounded by the spacer and an inner surface of the substrate and an inner surface of the diaphragm. The diaphragm has a pair of opposed planar surfaces. The substrate has its inner upper surface formed as a mesa. The mesa upper surface is generally curved in shape. However, due to manufacturing constraints that preclude the formation of a completely smooth curved mesa upper surface, the mesa upper surface instead comprises a series of concentric rings. The step height and diameter of these rings (i.e., the rise and run) are such that, at full deflection (i.e., flexing) of the diaphragm, the inner planar surface of the diaphragm touches the center of the mesa, but does not touch the edges of the individual steps. That is, if the edges of the steps are understood to define a curve, the radius of curvature of the diaphragm is smaller than the radius of curvature of the locus of the step corners.

The curved mesa of the present invention has utility in that the change in capacitance as the diaphragm moves closer to the mesa is larger than the capacitance change with the prior art planar mesa designs. That is, the quantity delta capacitance divided by capacitance is greater than prior art designs. This greater capacitance change for an identical amount of diaphragm flexing translates into greater sensitivity of the sensor.

DETAILED DESCRIPTION OF THE PREFERRED EMBODIMENTS

Figure 1:
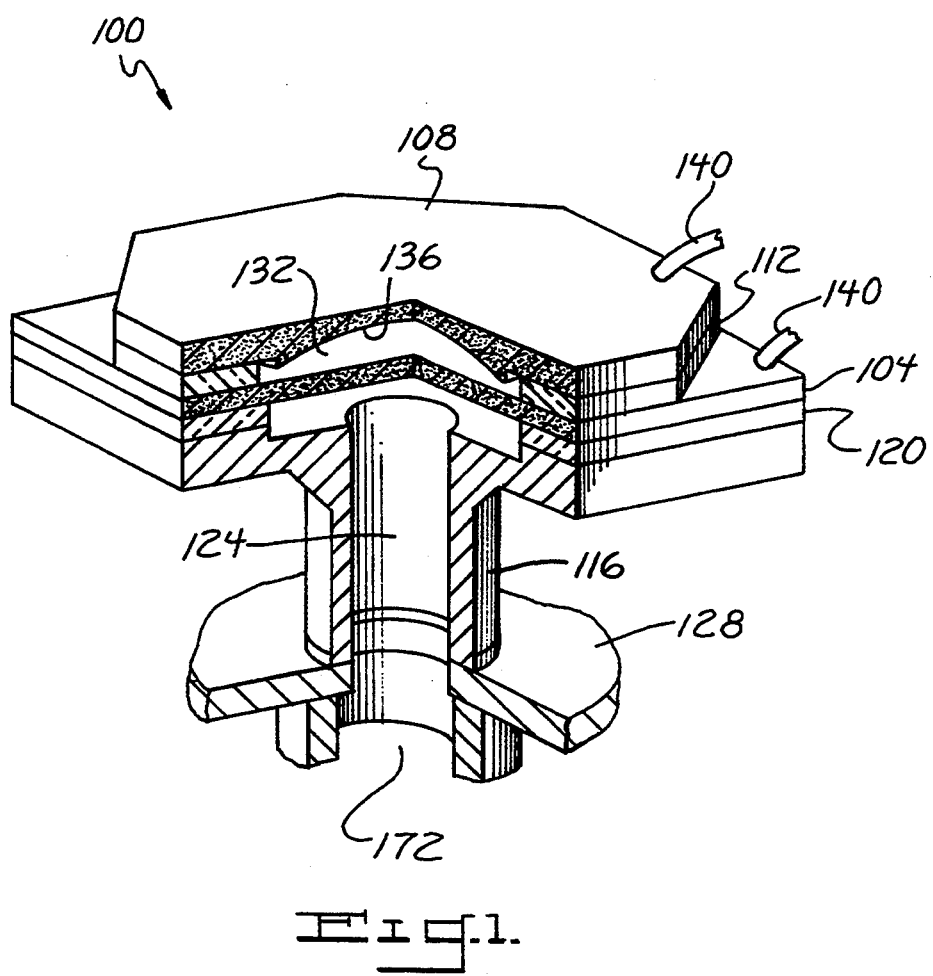
FIG. 1 is a perspective view, partially cut away to reveal a cross-sectional view of a silicon capacitive pressure sensor having a substrate with an upper mesa surface that is curved in a generally concave shape in accordance with the present invention.

Referring to the drawings in detail, an exemplary embodiment of a silicon capacitive pressure sensor having a substrate with a curved mesa upper surface according to the present invention is shown and generally designated by the reference numeral 100. The sensor 100 comprises a pair of parallel silicon capacitive plates (e.g., a diaphragm 104 and a substrate 108) separated by a borosilicate glass dielectric spacer 112. A silicon transition piece 116 is also provided that attaches to the silicon substrate 108 by a second glass dielectric spacer 120. The transition piece 116 has a throughbore 124 formed therein through which the fluid whose pressure is desired to be measured is applied to the diaphragm 104. The transition piece 116 may be mounted on a header 128, and the entire sensor 100 is encapsulated in a standard package (not shown), for example, a T03 package. Electronic signal processing circuitry (not shown) may also be included within the package.

Referring now to FIG. 1, there illustrated is a perspective view, partially cut away to expose in cross-sectional form a silicon capacitive pressure sensor 100. The sensor 100 may be somewhat similar in structure to that described in the following U.S. Patents Nos., all assigned to the assignee of the present invention, and all hereby incorporated by reference: U.S. Pat. Nos. 4,879,627; 4,883,768; 4,951,174; 4,954,925; 4,513,348; 4,415,948 and 4,405,970. The sensor 100 comprises a silicon diaphragm 104 and a silicon substrate 108, arranged in parallel and separated by a dielectric spacer 112. The spacer 112 is typically made of borosilicate glass that may comprise, for example, the commercially available Model 7070 borosilicate glass supplied by Corning. However, the glass may comprise other commercially available brands of borosilicate glass, such as the Model 7740 borosilicate glass provided by Corning and sold under the trademark PYREX®. Alternatively, the glass may comprise, if desired, other types of glass, such as phosphosilicate. Thus, the sensor 100 comprises a silicon-glass-silicon ("SGS") sandwich that is typically square and/or octagonal in its exterior configuration, but often may be circular or cylindrical in shape for its inner, operative substructure.

The diaphragm 104 comprises a square sheet or plate of appropriately doped silicon, which is somewhat flexible. The substrate 108 also comprises an appropriately doped sheet of silicon. The substrate 108 is typically less flexible than the diaphragm 104. The dielectric spacer 112 disposed between the diaphragm 104 and substrate 108 creates a closed, evacuated, hermetically-sealed chamber 132 between the two parallel silicon plates 104, 108. The chamber 132 is typically held at a zero vacuum value, or, if desired, it can be sealed at a higher reference pressure. The pressure within the chamber 132 depends upon the desired pressure value that the sensor 100 is designed to measure small variations or differential values thereround. The chamber 132 thus provides a reference pressure on one side of the flexible diaphragm 104.

A centrally-located, typically circular mesa 136 is formed on a surface of the substrate 108. The mesa 136 has a curved upper surface 138 according to the present invention, described in greater detail hereinafter. The mesa 136 extends into the generally cylindrical chamber 132. The substrate 108 containing the mesa 136 serves as a counter-electrode to the flexible diaphragm 104. A thin insulating glass layer (not shown) may cover the upper surface 138 of the mesa 136.

In the exemplary embodiment of the silicon capacitive pressure sensor 100 of FIG. 1, the spacing between an undersurface of the unflexed silicon diaphragm 104 and the center of the mesa 136 is approximately 2.5 microns, while the thickness of the borosilicate glass spacer 112 is typically 9 microns. For an exemplary sensor 100 designed to sense variations in absolute pressure of fifty lbs. per square inch (50 psi), the silicon diaphragm 104 is approximately 8 thousandths (0.008″)

of an inch thick, while the substrate 108 is approximately fifty thousandths (0.050") of an inch thick.

As the pressure applied to an outside surface of the diaphragm 104 varies, the diaphragm 104 flexes toward the substrate 108. This causes the spacing between the diaphragm 104 and the substrate 108 to change. Since the diaphragm 104 and the substrate 108 serve as the plates of a parallel plate capacitor, the inward flexing of the diaphragm 104 increases the capacitance of the sensor 100. The change in capacitance as a result of the change in the pressure applied to the surface of the diaphragm 104 is used as a measure of the pressure applied to the sensor 100.

A pair of electrical conductors or wires 140 are connected to the diaphragm 104 and substrate 108 for connection to a well-known signal processing circuit (not shown), located external to the sensor 100. The circuit may be located within the package (not shown) for the sensor 100. The circuit typically responds to the changing capacitance of the sensor 100 as a function of the applied pressure on the diaphragm 104. The varying pressure on the exterior, sensing surface of the flexible silicon diaphragm 104 causes the diaphragm 104 to flex. Such flexing changes the value of the intersticial capacitance between the diaphragm 104 and the substrate 108, which transduces the applied pressure into a measurable electronic signal. As noted hereinabove, there is an approximately 2.5 micron spacing between the undersurface of the diaphragm 104 and the center of the mesa 136 when the sensor 100 is at its zero or otherwise reference pressure. Such spacing allows room for the diaphragm 104 to flex toward the mesa 136 as the pressure applied on the exterior surface of the diaphragm 104 is increased.

The wall of the borosilicate glass spacer 112 typically has a horizontal thickness of, e.g., thirty-six thousandths (0.036") of an inch. The mesa 136 extends up from the silicon substrate 108 to a largest dimension of approximately 6.5 microns at the outer corners of the mesa 136. The diameter of the mesa 136 may be one hundred fifty thousandths (0.150") of an inch.

As illustrated in FIG. 1, the silicon diaphragm 104 may typically be square, while the silicon substrate 108 may have an octagonal shape. The octagonal shape of the substrate 108 provides access for attachment of the electrical wires 140 to the silicon diaphragm 104. In the exemplary embodiment of FIG. 1, the silicon substrate 108 has a side length of two hundred sixty thousandths (0.260") of an inch, while the wall of the borosilicate glass spacer 112 has an inner diameter of one hundred ninety thousandths (0.190") of an inch. The outer side surface of the wall spacer 112 can either follow the basic square configuration of the silicon diaphragm 104, or it may be octagonal, as illustrated in FIG. 1, similar to the octagonal shape of the substrate 108.

A transition piece 116, comprised of appropriately doped silicon, is fabricated with a borosilicate glass spacer 120 that, in turn, is bonded to the exterior surface of the silicon diaphragm 104. The glass spacer 120 may also comprise the Model 7070 glass provided by Corning or other suitable glass. The transition piece 116 includes a pressure port 124, which comprises a throughbore, through which the fluid whose pressure is to be sensed is communicated to the exterior surface of the diaphragm 104. The transition piece 116 tapers down to its pedestal shape for mounting to the surface of the header 128. The pedestal shape accommodates the temperature coefficient mismatch between the silicon and header material. Typically, the transition piece 116 has a thickness of approximately one hundred twenty-five thousandths (0.125") of an inch.

Figure 2:
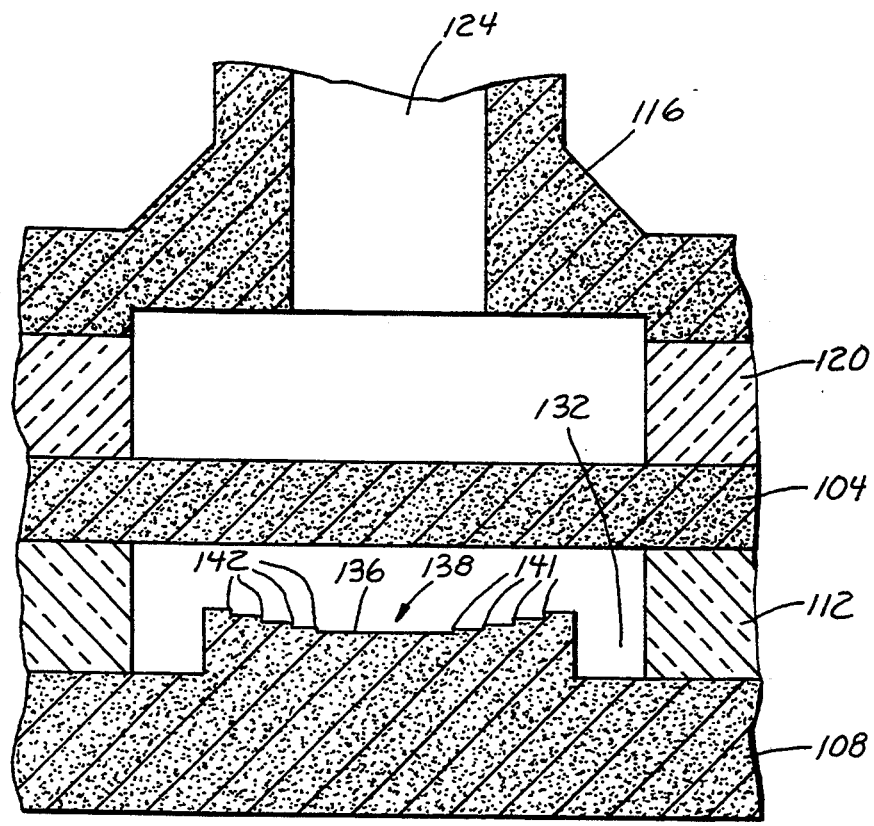
FIG. 2 is a cross-sectional view of the sensor of FIG. 1 showing the curved mesa upper surface in greater detail, and with the diaphragm of the sensor in an unflexed or rigid position.

FIG. 1 illustrates the substrate 108 having its mesa upper surface 138 as being of a curved, generally concave shape. In accordance with a preferred embodiment of the present invention, FIG. 2 illustrates the mesa surface 138 as comprising a series of concentric rings 141 emanating from the center point of the mesa upper surface 138. Although the broadest scope of the present invention contemplates a smooth concave upper surface 138 of the mesa 136, practical manufacturing techniques constrain the mesa upper surface 138 to instead approximate such a smooth concave surface by the series of concentric rings 141. A low point, height-wise, of the mesa upper surface 138 is at the exact center of the mesa upper surface 138. Each concentric ring 141 is of a predetermined rise and of a predetermined run such that each ring 141 attains a greater height from the center of the mesa upper surface 138 outward toward its periphery. Due to the aforementioned circular shape of the mesa 136, each ring 141 is also circular in shape. However, it is to be understood that the present invention is not limited as such; the rings 141 may take on other shapes, such as square, without departing from the broadest scope of the present invention.

Figure 3:
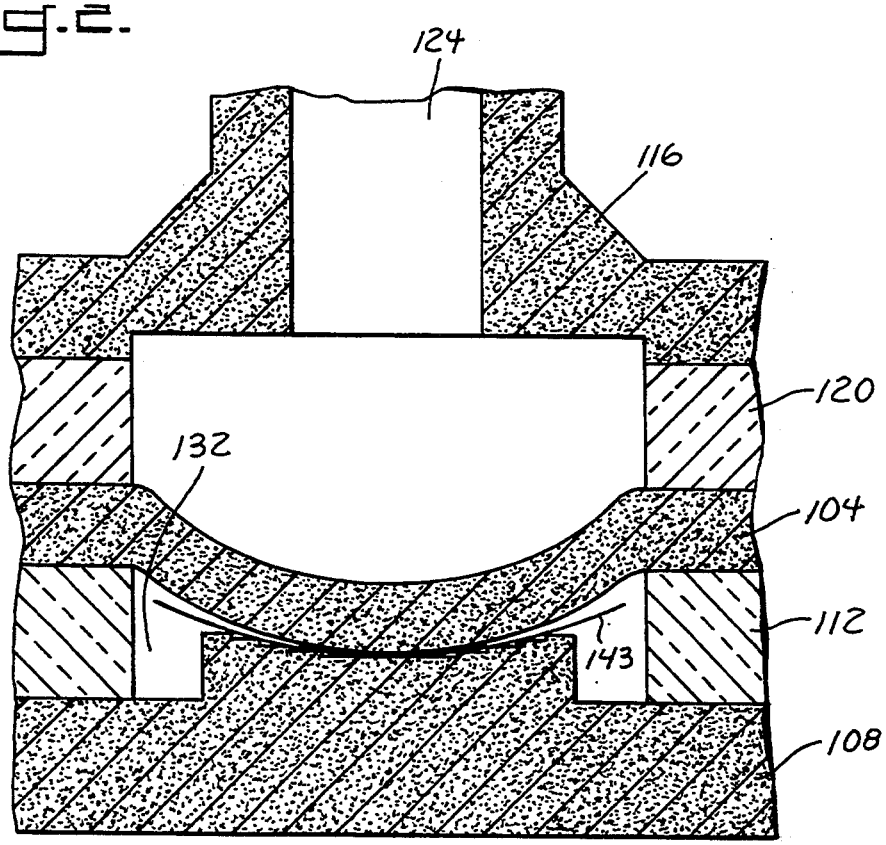
FIG. 3 is a cross-sectional view of the sensor of FIG. 1 with the diaphragm flexed toward the curved mesa surface of the substrate.
Figure 4:
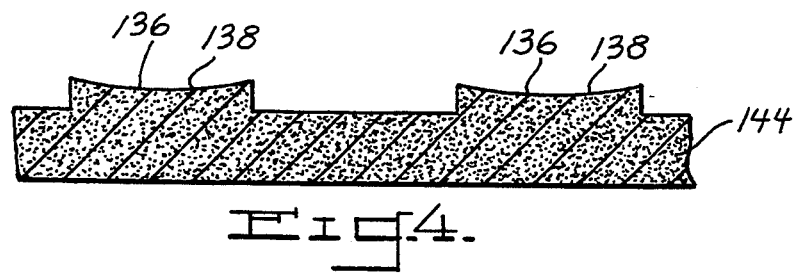
FIGS. 4–8 are cross-sectional views illustrating various steps in the sequential fabrication of the silicon capacitive pressure sensor of FIG. 1.

FIG. 3 illustrates the sensor 100 with the mesa upper surface 138 formed with the series of concentric rings 141. FIG. 3 illustrates, in somewhat exaggerated form, the diaphragm 104 of the sensor 100 at full deflection (i.e., flexing) due to the pressure of a fluid applied thereto. It can be seen that the diaphragm 104 touches the center point of the mesa upper surface 138. However, the diaphragm 104 does not touch the edges or corners 142 of any of the individual rings 141. That is, conceptually, the corners 142 of the rings 141 define a curve 143. Then, in accordance with the present invention, the rise and run of each ring 141 is chosen such that the radius of curvature of the diaphragm 104 at full deflection is smaller than the radius of curvature 143 of the locus of the step corners 142. That is, the radius of curvature of the diaphragm 104 at full deflection is smaller than the radius of curvature of the conceptual curve 143 drawn through the step corners.

As can be seen from FIG. 3, with the diaphragm 104 flexed, the air gap between the mesa upper surface 138 and an inner surface of the diaphragm 104 that faces the mesa upper surface 138 is more uniform or constant, as compared to prior art designs that employed a planar mesa upper surface 138. This more uniform or constant air gap provides for a greater change in capacitance as the diaphragm 104 moves closer to the mesa upper surface 138. That is, the curved mesa upper surface 138 of the present invention provides for a greater capacitance change for an identical amount of diaphragm flexing as compared to prior art planar mesa upper surface 138 designs. This greater capacitance change for an identical amount of diaphragm flexing translates into greater sensitivity of the sensor 100. In practice, it has been found that the amount of capacitance change is approximately doubled with the curved mesa upper surface 138 of the present invention, as compared to the planar mesa upper surface 138 designs of the prior art.

The mesa upper surface 138 with the plurality of concentric rings 141, in accordance with the present invention, may be fabricated using a number of different techniques. However, standard oxidation and etching techniques may be used to form the rings 141. In an exemplary embodiment of the present invention, each ring 141 has a rise or step height of approximately one-quarter micron. However, it is to be understood that the step height or rise, and the step run, are chosen depending on the specific design of the sensor 100. This is also true for the number of rings 141 chosen in the design. Further, the broadest scope of the invention is not limited to the fact that the radius of curvature of the diaphragm 104 is smaller than the radius of curvature of the locus of the step corners 142, which results in the center of the diaphragm 104 touching the center of the upper surface 138 of the mesa 136. Other relative curvatures of the diaphragm 104 and the mesa upper surface 138 are contemplated by the broadest scope of the present invention, and should be obvious to one of ordinary skill in the art in light of the teachings herein.

Referring now to FIGS. 4–8, there illustrated in cross-sectional form is the sequence of steps in fabricating the sensor 100 of FIG. 1. The starting point in the fabrication process is a commercially-available silicon wafer 144 (FIG. 4) that comprises the substrate 108 of a fabricated sensor 100. To make the wafer 144 suitably electrically conductive, the wafer 144 is appropriately doped with, for example, antimony. However, the substrate wafer 144 may either be doped with either N or P type impurities having a doping concentration of at least $10^{15}$ impurity per cubic centimeter to achieve less than 1 ohm-centimeter resistivity. Using well-known masking, photoresist and etching techniques, the substrate wafer 144 is etched away at predetermined locations to create a plurality of mesas 136 with the curved upper surface 138 of the present invention, each mesa 136 being approximately 6.5 microns in height at its highest point.

Figure 5:
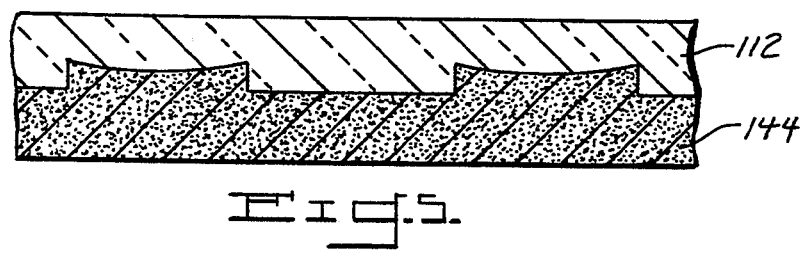
Figure 6:
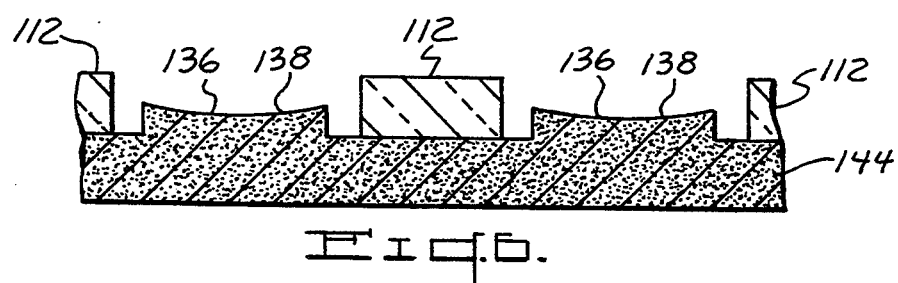

Next, referring to FIG. 5, the glass that serves as the dielectric 112 between the diaphragm 104 and the substrate 108 is deposited onto the silicon substrate wafer 144. The glass 112 may be deposited onto the wafer 144 using any one of a number of well-known deposition techniques, such as vacuum deposition or sputtering. One sputter-deposition technique that may be used to deposit the glass is an ion-milling technique, as described and claimed in copending U.S. patent application entitled "A Silicon Capacitive Pressure Sensor Having A Glass Dielectric Deposited Using Ion Milling", filed Dec. 2, 1993, Ser. No. 08/161335, and assigned to the same assignee as the present invention. The glass 112 is deposited to a thickness of approximately 9 microns. The deposited glass 112 serves three purposes: as a dielectric spacer 112 forming an enclosed vacuum chamber 132 between the conductive substrate 108 and conductive diaphragm 104; as a means of forming a precise gap between the diaphragm 104 and substrate 108; and as an agent for bonding the silicon substrate 108 and diaphragm 104 to the spacer 112.

The type of glass used as the spacer 112 is important. In an exemplary embodiment of the present invention, the glass 112 comprises the Model 7070 borosilicate glass provided by Corning. This glass 112 has thermal properties (e.g., thermal expansion coefficients) similar to the silicon substrate 108. Also, this specific model of glass 112 has lithium and potassium ions that are available to assist in the bonding of the diaphragm 104 to the glass spacer 112, as described in greater detail hereinafter. However, the glass may comprise other commercially available brands of borosilicate glass, such as Model 7740 borosilicate glass provided by Corning and sold under the trademark PYREX ®. Alternatively, the glass may comprise, if desired, other types of glass, such as phosphosilicate. The type of glass utilized is based in part on the type(s) of alkali contained in the glass.

Next, the silicon substrate wafer 144 with the glass 112 formed thereon may be subject to thermal processing, such as annealing, to reduce any stresses in the glass 112. If desired, the silicon substrate wafer 144 with the glass 112 thereon may be subject to an exemplary multiple-step thermal processing procedure described and claimed in copending U.S. patent application entitled "Thermal Processing of Deposited Glass", filed Dec. 21, 1993, Ser. No. 08/171,011 and assigned to the same assignee as the present invention. This process ensures that any gas trapped into the glass spacer 112 by the sputter-deposition process will be diffused out of the glass.

After the substrate wafer 144 with the glass spacer 112 has been subjected to thermal processing, the borosilicate glass layer 112 is appropriately etched or patterned (see FIG. 6) using well-known photolithography and etching techniques. This forms the glass spacer 112 only around the approximate perimeter of that portion of the silicon substrate wafer 144 that comprises the substrate 108 of the fabricated sensor 100. If desired, although not shown in the figures herein, the borosilicate glass layer 112 may be patterned into a pair of concentric rings, as described and claimed in copending U.S. patent application entitled "A Capacitive Pressure Sensor having a Reduced Area Dielectric Spacer", Ser. No. 08/188,257, filed on even date herewith, and assigned to the same assignee of the present invention. The pair of concentric rings comprising the spacer 112 reduces the amount of parasitic capacitance of the sensor 100, thereby increasing the sensitivity of the sensor 100.

Figure 7:
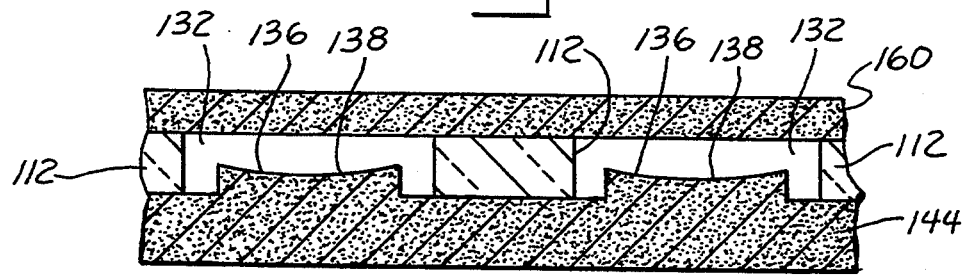

After the substrate wafer 144 has been prepared as described hereinbefore, a second silicon wafer 160 may be prepared, by suitable lapping to a desired thickness, such as on the order of 200 microns (i.e., approximately eight mils (0.008")), to form the flexible diaphragm 104 (see FIG. 7). In a similar manner to the silicon substrate wafer 144, the silicon diaphragm wafer 160 may be appropriately doped with the desired impurities. The silicon diaphragm wafer 160 is then bonded to the dielectric glass spacer 112 using known electrostatic bonding techniques. For example, the diaphragm wafer 160 may be bonded using the known field-assisted sealing technique of joining glass to semiconductors. This technique involves subjecting the diaphragm wafer 160 to temperatures of approximately 300°–500° C. to induce ionic mobility within the borosilicate glass. The aforementioned Model 7070 glass from Corning has lithium and potassium ions available at high temperature that may be used in this electrostatic bonding technique. After being heated to a high degree of conductivity, the glass spacer and diaphragm junction is then subjected to an electric potential on the order of 100 volts DC. This produces a depletion layer at the interface between the silicon and the glass. If the electric potential is properly directed, the positive lithium and potassium ions drift away from the interface and a high field is created across this interface. This causes intimate contact between the glass spacer 112 and the silicon diaphragm wafer 160. In this manner, a hermetic seal between the silicon and glass is formed. This abovedescribed process is normally accomplished in a vacuum in order to provide an absolute pressure sensor.

Both the silicon substrate wafer 144 and silicon diaphragm wafer 160 may have a thin metallization layer deposited locally thereon, for example, a layer of about five thousand angstroms of aluminum. This provides a suitable surface for wire bonding of the electrical wires 140 to both the diaphragm 104 and the substrate 108.

Next, another wafer 164 of appropriately doped silicon is provided. This silicon wafer comprises the transition piece 116 of a fabricated sensor 100. More particularly, the wafer 164 has the desired transition pieces 116 formed at appropriate locations in the wafer by forming the pedestal-shaped outer surface and the throughbores 124 therein. The pedestal shapes and throughbores 124 may be etched in the transition piece silicon wafer 164 using various techniques. For example, the shapes and throughbores 124 may be formed in the transition piece using the electrical discharge machining ("EDM") techniques described and claimed in copending U.S. patent application entitled "Fabricating Complex Silicon Pieces Using Electrical Discharge Machining", filed Dec. 2, 1993, Ser. No. 08/161156, and assigned to the same assignee as the present invention. The transition piece wafer 164 may be on the order of one hundred twenty-five thousandths (0.125") of an inch thick.

Figure 8:
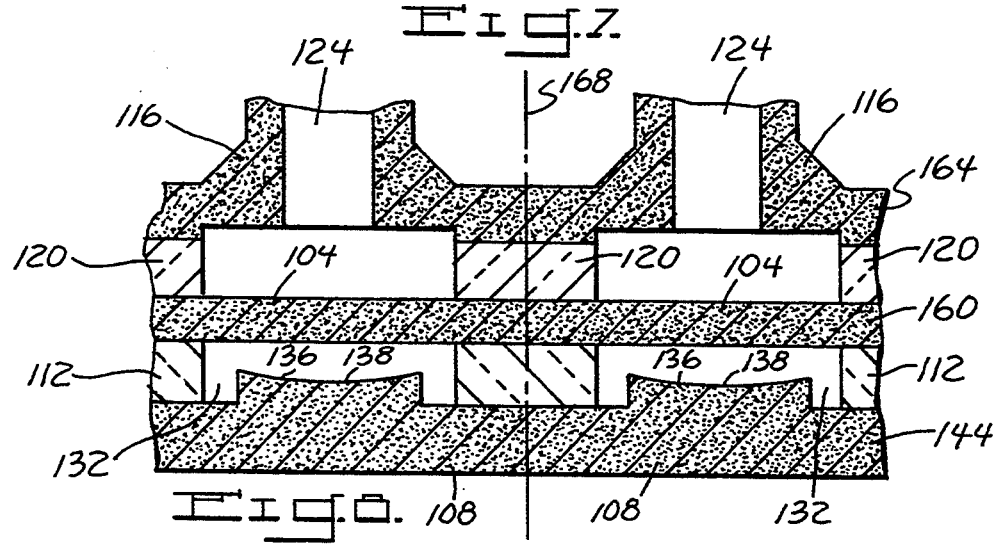

The transition piece wafer 164 then has a layer 120 of dielectric glass deposited thereon. The glass deposited onto the silicon wafer 164 may also comprise the Model 7070 borosilicate glass from Corning. The glass layer 120 may be deposited in an identical manner as the glass spacer 112 deposited onto the silicon substrate 108. The second glass layer 120 is photolithographically patterned and etched into a ring only around the perimeter of the resulting transition piece 116. The glass layer 120 is then bonded to the silicon diaphragm wafer 160 using electrostatic bonding techniques. The glass layer 120 contacts the diaphragm wafer 160, as illustrated in FIG. 8.

Once the aforementioned steps illustrated in FIGS. 4–8 have taken place, the resulting silicon and glass multilayered component is diced appropriately, such as by sawing, to provide a plurality of individual piece parts, as indicated by the phantom lines 168. Also, both the silicon substrate 108 and the glass spacer 112 may, if desired, be cut into an octagon shape to expose the electrical connection points on the silicon diaphragm 104.

The individual piece part silicon capacitive pressure sensor 100 may then be mounted to a surface of the header 128 (FIG. 1). The header may comprise a material sold under the trademark KOVAR ®, or other similar alloys. The header has a throughbore 172 that acts as a pressure port through which the fluid whose pressure is desired to be measured by the sensor 100 is applied thereto. The throughbore 124 of the transition piece 116 is aligned over the pressure port 172 such that the transition piece 116 is in contact with the surface of the header 128. The transition piece 116 is then bonded to the header 128 using an eutectic bonding process. This process involves coating with gold the outer surface of the silicon transition piece 116 that is to contact the header 128. Then, the sensor 100 and the header 128 are heated at an elevated temperature to bond the sensor 100 to the header 128.

It should be understood by those skilled in the art that structural modifications can be made without departing from the spirit of the invention. Accordingly, reference should be made primarily to the accompanying claims, rather than the foregoing specification, to determine the scope of the invention.

Having thus described the invention, what is claimed is:

1. A capacitive pressure sensor operable to sense a pressure of a fluid applied thereto and to provide capacitive indicia of the fluid pressure, comprising:
  a. an electrically-conductive diaphragm operable to flex in the presence of a pressure of the fluid applied thereto;
  b. an electrically-conductive substrate having a non-planar surface; and
  c. a dielectric material disposed between the diaphragm and the substrate, wherein the non-planar surface of the substrate has formed therein one or more concentric rings, each of the rings having a step shape with a predetermined rise and a predetermined run, the ring increasing in overall step height outwardly from a lowest point at a center of the non-planar surface to a highest point at the ring that is disposed farthest from the center point of the non-planar surface.

2. The sensor of claim 1, wherein the non-planar surface of the substrate is formed on a mesa of the substrate.

3. The sensor of claim 1, wherein the non-planar surface of the substrate has a concave shape.

4. The sensor of claim 1, wherein each of the rings has a step height and a step diameter such that a curve formed by corners of the steps is of a predetermined radius of curvature.

5. The sensor of claim 4, wherein the predetermined radius of curvature of the curve formed by the corners of the steps of the non-planar surface is greater than a radius of curvature of the diaphragm when the diaphragm has attained a maximum flexing position 6. The sensor of claim 5, wherein when the diaphragm has achieved the maximum flexing position, a center point of the diaphragm is in contact with the center of the non-planar surface of the substrate.

7. In a capacitive pressure sensor having an electrically conductive diaphragm with a planar inner surface and an outer surface to which a fluid whose pressure is desired to be measured is applied, the sensor having an electrically-conductive substrate with an inner surface opposite the inner surface of the diaphragm, the sensor also having a dielectric spacer disposed between the diaphragm and the substrate at outer peripheral portions thereof such that an enclosed chamber is formed bounded by the spacer and the inner surface of the diaphragm and the inner surface of the substrate, the diaphragm being operable to flex in the presence of a pressure of the fluid that exceeds a pressure of a fluid within the enclosed chamber, the substrate remaining rigid throughout any flexing of the diaphragm, the diaphragm and the substrate forming plates of a capacitor whose capacitance value changes as the diaphragm flexes thereby providing indicia of the pressure of the fluid applied to the outer surface of the diaphragm, wherein the improvement comprises: the inner surface of the substrate is non-planar, and wherein the non-planar surface of the substrate has formed therein one or more concentric rings, each of the rings having a step shape with a predetermined rise and predetermined run, the rings increasing overall in step height outwardly from a lowest point at a center of the non-planar surface of the substrate to a highest point at the ring that is disposed farthest from the center point of the non-planar surface of the substrate.

8. The sensor of claim 7, wherein the non-planar surface of the substrate is formed on a mesa of the substrate.

9. The sensor of claim 7, wherein the non-planar surface of the substrate has a concave shape.

10. The sensor of claim 7 wherein each of the rings has a step height and a step diameter such that a curve formed by corners of the steps is of a predetermined radius of curvature.

11. The sensor of claim 10, wherein the predetermined radius of curvature of the curve formed by the corners of the steps of the non-planar surface is greater than a radius of curvature of the diaphragm when the diaphragm has attained a maximum flexing position.

12. The sensor of claim 11, wherein when the diaphragm has achieved the maximum flexing position, a center point of the diaphragm is in contact with the center of the non-planar surface of the substrate.

13. A capacitive pressure sensor, comprising:
  a. a flexible diaphragm that is electrically-conductive;
  b. a rigid substrate that is electrically-conductive; and
  c. A dielectric spacer disposed between the diaphragm and the substrate such that an enclosed cavity is formed bonded by the spacer, an inner surface of the diaphragm and an inner surface of the substrate, wherein the inner surface of the substrate is non-planar, and wherein the non-planar inner surface of the substrate has formed therein one or more concentric rings, each of the rings having a step shape with a predetermined rise and predetermined run, the rings increasing overall in step height outwardly from a lowest point at a center of the non-planar inner surface of the substrate to a highest point at the ring that is disposed farthest from the center point of the non-planar inner surface of the substrate, each of the rings having a step height and a step diameter such that a curve formed by corners of the steps is of a predetermined radius of curvature, the predetermined radius of curvature of the curve formed by the corners of the steps of the non-planar inner surface of the substrate is greater than a radius of curvature of the diaphragm when the diaphragm has attained a maximum flexing position, wherein when the diaphragm has achieved the maximum flexing position a center point of the diaphragm is in contact with the center of the non-planar inner surface of the substrate.

14. The sensor of claim 13, wherein the non-planar inner surface of the substrate is formed on a mesa of the substrate.

15. The sensor of claim 13, wherein the non-planar inner surface of the substrate has a concave shape.

16. The sensor of claim 13, wherein the diaphragm and the substrate both comprise silicon, the silicon diaphragm and the silicon substrate forming plates of a capacitor whose capacitance value varies as the diaphragm flexes as a result of a pressure of a fluid applied to an outer surface of the diaphragm.

17. The sensor of claim 13, wherein the dielectric spacer comprises glass.

* * * * *